United States Patent [19]

Abe et al.

[11] 3,874,695

[45] Apr. 1, 1975

[54] VEHICLE SAFETY DEVICE ACTUATION ARRANGEMENT

[75] Inventors: Fumiyuki Abe, Yokohama; Takashi Oka, Tokyo; Shigeo Fukuda, Fujisawa; Shunji Matsui, Yokohama; Kenzo Hirashima, Yokohama; Akio Hosaka, Yokohama, all of Japan

[73] Assignee: Nissan Motor Company Limited, Yokohama City, Japan

[22] Filed: July 31, 1973

[21] Appl. No.: 384,170

[30] Foreign Application Priority Data
Aug. 1, 1972 Japan................................ 47-76516
Aug. 1, 1972 Japan................................ 47-89869
Jan. 10, 1973 Japan................................ 48-5286

[52] U.S. Cl. ......................................... 280/150 AB
[51] Int. Cl. ............................................. B60r 21/08
[58] Field of Search.............................. 280/150 AB

[56] References Cited
UNITED STATES PATENTS
3,477,740  11/1969  Hass............................. 280/150 AB
3,655,929  4/1972  Engel............................ 280/150 AB
3,741,584  6/1973  Arai.............................. 280/150 AB
3,758,131  9/1973  Stephenson .................. 280/150 AB Primary Examiner—Robert B. Reeves
Assistant Examiner—Thomas E. Kocovsky

[57] ABSTRACT

An inflatable confinement expansible to part or to full capacity depending upon the magnitude of a collision encountered by a motor vehicle. The limited or stepwise expansion of the inflatable confinement is achieved by the use of retarding means to actuate some of the gas-generating means for the inflatable confinement delayedly after the collision condition has been incipiently brought about.

12 Claims, 17 Drawing Figures

VEHICLE SAFETY DEVICE ACTUATION ARRANGEMENT

The present invention relates to vehicle safety device actuation arrangements and more particularly to a vehicle safety device actuation arrangement for the device type using an inflatable confinement which is commonly called the air bag.

To protect an occupant of a vehicle such as an automobile from injury in the event of an impact is encountered by the vehicle, a safety arrangement is utilized which is equipped with an inflatable confinement having a folded or collapsed inoperative position. When an impact is responded to by the safety arrangement, the inflatable confinement is expanded and moved to a protective position by gas under pressure which is instantaneously directed into the confinement. The gas under pressure is usually stored in a sealed container or generated as a result of firing an explosive charge. The container is opened or the explosive charge is fired by means of an actuating mechanism which is responsive to the impact or to a condition likely to lead to an impact of the vehicle. The actuating mechanism is usually so constructed as to direct the pressurized gas into the inflatable confinement and to expand the confinement to its full capacity in a time period of the order of microseconds so that the vehicle occupant can be protected with certainty.

In the following description the vehicle safety device actuation arrangement is referred to as vehicle safety arrangement for the sake of brevity.

The inflatable confinement in the prior art safety arrangement is thus expanded to its full capacity at once and without respect to the velocity of the vehicle at the instant the collision is encountered. It therefore follows that a sudden rise is caused in the pressure of air in the passenger compartment of the vehicle as a consequence of the rapid or instantaneous expansion of the inflatable confinement. Such a sudden rise in the pressure in the passenger compartment tends to cause damage to the occupant's ear drums. The sudden expansion of the inflatable confinement is accompanied by a loud detonation which is also consequent on an auricular impediment to the vehicle occupant. If, moreover, the vehicle occupant involved in the collision condition happens to be in an unusual posture, like an infant rising to the feet on the seat or the floor of the vehicle cabin, there will even be a danger of such an occupant being forcefully flung rearwardly by the expanded confinement.

It is, therefore, a first important object of the present invention to provide an improved vehicle safety arrangement having an inflatable confinement and an actuating mechanism which is adapted to expand the inflatable confinement to a degree which is dependent upon the magnitude of the impact exerted on the safety arrangement during collision of a vehicle. To achieve this end, the present invention proposes to substantially immediately expand the inflatable confinement to part of its full capacity when the collision is encountered at a relatively low vehicle velocity and to stepwise expand the inflatable confinement to its full capacity when the collision is encountered at a relatively high vehicle velocity. While the safety arrangement of this nature is adapted to operate in two different modes depending upon the magnitude of the impact, the safety arrangement may be so modified as to operate in three different modes in accordance with the magnitude of the impact exerted on the vehicle so that the inflatable confinement is substantially immediately expanded to its full capacity when the collision is encountered at an extremely high vehicle velocity.

As another important problem of the vehicle safety arrangement of the type using the inflatable confinement, it has been pointed out that the inflatable confinement is of less importance to drivers of motor vehicles than to other vehicle occupants especially assistant drivers on the front seat. During the collision condition, the vehicle driver is left with his hands on the steering wheel serving as a prop for his upper body while no protective obstacle is provided to other occupants of the front seat. The protection to the driver will be enhanced where the motor vehicle is equipped with a steering column on the collapsible type which is adapted to absorb a major portion of the energy of impact exerted on the vehicle driver in the event of a frontal collision of the motor vehicle. Still another problem encountered with the safety arrangement using the inflatable confinement is that the expanded confinement becomes a hindrance to the driver's frontal viewing and thus provides another important source of a danger to the vehicle occupants. It is, therefore, desirable to have the inflatable confinement for the driver held inoperative or expanded to a limited size when the collision is encountered at a relatively low vehicle velocity. Since, moreover, the inflatable confinement for the vehicle driver in particular may be of a lesser size than those for other vehicle occupants, the former may be blown with the pressurized gas at a timing which is appropriately retarded from the timing at which the other confinements are expanded.

It is, thus, a second important object of the present invention to provide an improved vehicle safety arrangement comprising at least two inflatable confinements which are allocated respectively to the driver and another occupant of the vehicle such as an occupant of the front seat next to the driver.

As previously noted, the gas under pressure is usually introduced into the inflatable confinement in three consecutive steps of initiating into action the actuating mechansim for the sealed container or the explosive charge, opening the container or firing the explosive charge, and directing the resultant gas under pressure into the inflatable confinement which has been held in the folded or collapsed condition. The actuating mechanism includes igniting means which is usually an electric blasting cap or detonator which is adapted to be fired in response to the collision condition detected by suitable sensing means. In the prior art vehicle safety arrangement of the described nature, therefore, provision of both the gas generating means such as the stored explosive charge and the blasting cap to fire the explosive charge is required separately for the inflatable confinement. As a consequence, not only is the overall configuration of the safety arrangement enlarged but also extreme difficulties are encountered in actuating the blasting cap and the gas generating means at precisely controlled timings.

It is, therefore, a third important object of the present invention to provide a vehicle safety arrangement using an inflatable confinement and including gas generating and igniting means which are incorporated in a compact, small-sized configuration into the safety arrangement and which are adapted to be initiated into action timings which can be easily and precisely controlled depending upon the magnitude of the impact exerted on the safety arrangement.

All the objects thus far set forth as commonly accomplished in accordance with the present invention in a vehicle safety arrangement which comprises at least one inflatable confinement which is adapted to be expanded to a protective position in response to an impact exerted on the vehicle or to a condition which is likely to lead to such an impact, a plurality of electrically-actuated, explosive-charged, gas-generating means each operative to direct gas under pressure into the inflatable confinement when actuated, at least two switch means which are electrically connected in parallel between a power source and the gas-generating means and which are respectively responsive to different magnitudes of impact detected thereby, and retarding means operatively associated with at least one of the gas-generating means for causing a selected one of the gas-generating means to be actuated at a retarded timing, wherein at least one of the gas-generating means which is selected depending upon the magnitude of the impact detected by the switch means is actuated so as to direct the gas under pressure into the inflatable confinement by actuation of at least one of the switch means responding to the magnitude of the impact for thereby expanding the inflatable confinement substantially immediately to part of its full capacity when the magnitude of the impact is below a predetermined relatively low level and stepwise to its full capacity when the magnitude of the impact is above a predetermined relatively high level.

In one preferred embodiment of the vehicle safety arrangement thus constructed, the arrangement may more specifically comprise at least one inflatable confinement adapted to be expanded to a protective position in response to an impact exerted on the vehicle or to a condition which is likely to lead to such am impact, first and second electrically-actuated, explosive-charged, gas-generating means each operative to direct gas under pressure into the inflatable condinement when actuated, first and second switch means which are electrically connected in parallel to a power source and in series between the source and the first and second gas-generating means, respectively, and which are responsive to impacts of magnitudes above first and second predetermined levels, respectively, of which the former is lower than the latter, each of the first and second gas-generating means being actuated so as to direct the gas under pressure into the inflatable confinement when the switch means associated therewith responds to an impact of a magnitude above the level which is predetermined therefor, and retarding means operatively associated with the second switch means and the second gas-generating means for causing the second gas-generating means to be actuated at a retarded timing after the first gas-generating means has been actuated in response to the impact so that the inflatable confinement is expanded substantially immediately to part of its full capacity when the magnitude of the impact detected by the first and second switch means is above the first predetermined level and below the second predetermined level and stepwise to the full capacity of the confinement when the magnitude of the impact is above the second predetermined level.

Where desired, the vehicle safety arrangement of the character above described may further comprise third switch means which is electrically connected in parallel with the second switch means to the power source and in series between the source and the second gas-generating means and which is responsive to an impact of a magnitude above a third predetermined level which is above the second predetermined level so that the inflatable confinement is expanded substantially immediately to its full capacity when the magnitude of the impact detected by the three switch means is above the third predetermined level.

In another preferred embodiment of the present invention, the vehicle safety arrangement may comprise at least two, first and second, inflatable confinements which are adapted to be expanded to protective positions by gas under pressure in response to an impact exerted on the vehicle or to a condition which is likely to lead to such an impact, first and second electrically-actuated, explosive-charged, gas-generating means both of which are operative, when actuated, to direct gas under pressure into the first inflatable confinement, third electrically-actuated, explosive-charged, gas-generating means which is operative to direct gas under pressure into the second inflatable confinement when actuated, first switch means which is electrically connected between a power source and the first gas-generating means and which is responsive to an impact of a magnitude above a first predetermined level, second and third switch means which are electrically connected in parallel to the power source and in series between the source and the second and third gas-generating means and which are responsive to impacts of magnitudes which are above the second and third predetermined levels wherein the second predetermined level is above the first predetermined level and the third predetermined level is above the second predetermined level, and retarding means operatively associated with the second switch means for causing timing of the actuation of the second gas-generating means to be retarded when the second switch means responds to an impact of a magnitude above the second predetermined level, whereby the first inflatable confinement is expanded substantially immediately to part of its full capacity when the magnitude of the impact detected by the three switch means is above the first predetermined level and below the second predetermined level, the first inflatable confinement is expanded stepwise and the second inflatable confinement is expanded immediately to their respective full capacities when the magnitude of the impact is above the second predetermined level and below the third predetermined level, and the first and second inflatable confinements are expanded substantially immediately when the magnitude of the impact is above the third predetermined level.

The safety arrangement of the character above described will be advantageous if the first inflatable confinement is allocated to any vehicle occupant other than the driver of the vehicle, such as an occupant of the front seat and the second inflatable confinement is allocated to the driver. In this instance, the second inflatable confinement is held inoperative unless the magnitude of the impact detected by the switch means is above the first predetermined but below the second predetermined level and is expanded at a retarded timing if the magnitude of the impact is above the second predetermined level and below the third perdetermined level. The inflatable confinement for the vehicle occupant other than the driver, on the other hand, is expanded to part of its full capacity in response to the impact of the magnitude below the second predetermined level insofar as the magnitude is above the first predetermined level. The above described safety arrangement is thus useful especially for the assurance of protection of the driver although it also is advantageous for protecting the occupact of the vehicle other than the driver.

Where desired, however, the second inflatable confinement may be connected to the first switch means in lieu of the second and third switch means so that the second inflatable confinement is expanded to its full capacity in response to an impact of a magnitude below the second predetermined level. In this instance, the second and third switch means should be connected in parallel solely to the second gas-generating means so that only the first inflatable confinement is capable of responding to an impact of a magnitude above the second predetermined level.

In still another preferred embodiment of the present invention, the vehicle safety arrangement may comprise at least one inflatable confinement which is expanded to a protective position in response to an impact exerted on the vehicle or to a condition which is likely to lead to such an impact, at least two, first and second, electrically-actuated, explosive-charged, gas-generating means which are positioned within the inflatable confinement and each of which is operative, when actuated, to produce gas under pressure in the inflatable confinement, first and second switch means responsive to impacts of magnitudes above first and second predetermined levels, respectively, of which the former is below the latter, the first switch means being electrically connected in series between a power source and the first and second gas-generating means for actuating the first and second-gas-generating means in response to an impact of a magnitude above the first predetermined level and the second switch means being electrically connected between the power source and the second gas-generating means for actuating the second gas-generating means in response to an impact of a magnitude above the second predetermined level, and retarding means connected with the first switch means and the second gas-generating means for causing the second gas-generating means to be actuated at a retarded timing when the first switch means responds to the impact of the magnitude above the first predetermined level.

The switch means playing an important role in the vehicle safety arrangement of any of the forms thus far described may be of the inertia-responsive type or the deceleration-responsive type to detect an actual collision condition of a vehicle or of the built-in radar type which is responsive to dimensions of an obstacle with which the vehicle is about to collide and/or a rate of change of the vehicle speed relative to such an obstacle so as to detect a condition which is likely to lead to a collision.

The features of the vehicle safety arrangement according to the present invention will become more apparent from the following description taken in conjunction with the accompanying drawings in which like reference numerals and characters designate corresponding units and elements in some figures and in which.

Figure 1:
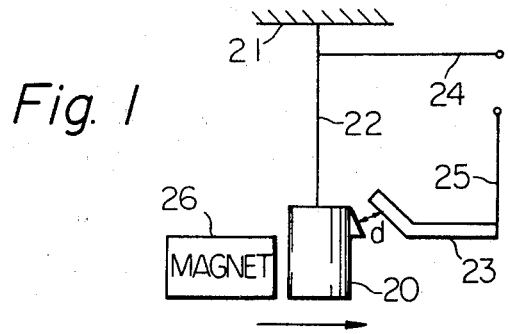
FIG. 1 is a schematic view showing a typical example of an inertia-responsive switch which may be incorporated in the vehicle safety arrangement according to the present invention.

Reference will now be made to the drawings, first to FIG. 1 in which a typical example of the inertia-responsive switch applicable to but not limitative of the present invention, the switch per se being well known in the art.

The inertia-responsive switch of the shown configuration comprises a mass member 20 of an electrically conductive and magnetic material. The mass member 20 is suspended from an overlying stationary member 21 by a suitable electrically conductive, flexible line such as a wire 22. Positioned at a suitable spacing from the electrically conductive mass member 20 is a stationary member 23 of an electrically conductive, preferably pliable material. The wire 22 and the stationary member 23 are connected to electric leads 24 and 25, respectively, which in turn are connected to positive and negative terminals of a d.c. power source (not shown). The mass member 20 and stationary member 23 thus serve as movable and stationary contacts, respectively. Adjacent to the mass member 20 is further positioned a magnet 26 which usually is a permanent magnet. The magnet 26 attracts the mass member 20 by a prescribed magnetic force so that the mass member 20 is baised to be spaced apart a prescribed distance of $d$ from the stationary member 23, whereby the contacts 20 and 23 are normally held disengaged by means of magnetic force exerted by the magnet 26.

When, in operation, the mass member 20 thus biased to be spaced apart from the stationary member 23 is subjected to an impact or a rate of acceleration in the direction of an arrow (no numeral), viz., toward the stationary member 23, then the mass member 20 will be brought into contact with the stationary member 23 if the magnitude of the impact or the rate of acceleration is such that it is capable of overcoming the magnetic restrain on the mass member 20. The contacts 20 and 23 are consequently engaged and accordingly a closed circuit is completed across these contacts.

Figure 2:
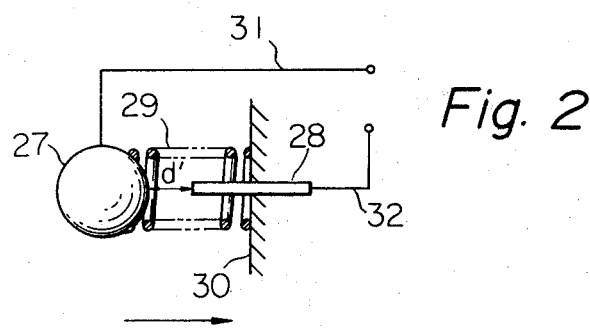
FIG. 2 is a schematic view of another typical example of the inertia-responsive switch applicable to the safety arrangement.

The inertia-responsive switch of the construction shown in FIG. 2 is essentially similar in effect to that above described. Thus, the inertia-responsive switch illustrated in FIG. 2 comprises a spherical mass member or ball 27 of an electrically conductive material, the ball resting on a stationary support (not shown). In the vicinity of this ball 27 is located a stationary member 28 of also an electrically conductive material. A suitable resilient biasing element such as a helical compression spring 29 is seated at one end on a stationary wall 30 and receives at the other end the ball 27 for holding the ball spaced a prescribed distance of $d'$ apart from the stationary member 28. The ball 27 and the stationary member 28 thus serve as movable and stationary contacts, respectively, and are connected to electric leads 31 and 32, respectively, as in the switch illustrated in FIG. 1.

The movable and stationary contacts 27 and 28 are normally held disengaged by means of the spring 29 but, when the ball 27 is subjected to an impact or a rate of acceleration in the direction of an arrow (no numeral), viz., toward the stationary member 28 against the opposing force of the coil spring 29. If, in this condition, the impact or the rate of acceleration exerted on the ball 27 is of such a magnitude as to overcome the force of the spring 29, then the ball 27 will engage the stationary member 28 so that the leads 31 and 32 are connected to each other through the engaged contacts 27 and 28.

In the inertia-responsive switch of either of the configurations above described, the magnitude of impact or the rate of acceleration causing the mass member 20 or 27 to contact the associated stationary member 23 or 28, respectively, can be determined through selection of the weight of the mass member and/or the magnetic or mechanical restraint exerted on the mass member by the magnet 26 or the spring 29. The time interval intervening between the initial application of the impact or the rate of acceleration to the mass member 20 or 27 and the contact achieved between the mass member 20 or 27 and the stationary member 23 or 28, respectively, can on the other hand be determined through selection of the distance $d$ or $d'$ between the mass member 20 or 27 and the stationary member 23 or 28 which are initially spaced apart from each other.

Figure 3:
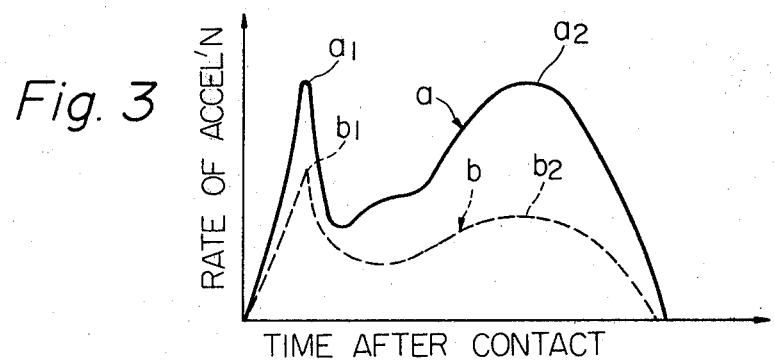
FIG. 3 is a graph showing curves which indicate examples of changes in the acceleration applied on the inertia-responsive switch in a vehicle body after the vehicle has encountered a collision.

FIG. 3 illustrates general tendencies of the variation of the rate of acceleration of an inertia-responsive switch in a motor vehicle after the motor vehicle has encountered a collision, wherein curves $a$ and $b$ are representative of such variations resulting from collisions at relatively high and relatively low vehicle velocities. As will be apparent from these curves $a$ and $b$, the rates of acceleration reach first maxima as at $a_1$ and $b_1$ immediately after the collisions have been initially encountered by the motor vehicles, drop down for a moment and reach second maxima as at $a_2$ and $b_2$ before the rates of acceleration finally decline toward the ends of the collision conditions. The particular tendencies are considered to result from the provision of the bumpers or similar shock absorbing structures of the motor vehicles and are, thus, pronounced where the motor vehicles are equipped with bumpers having increased mechanical strength to protect the vehicle bodies from damage in the event of collisions encountered at a relatively low vehicle velocity. From the above discussion, it will be understood that the inertia-responsive switch of the nature previously described is actuated or closed in response to teaching the first peak of the rate of acceleration applied to the mass member of the switch.

Figure 4A:
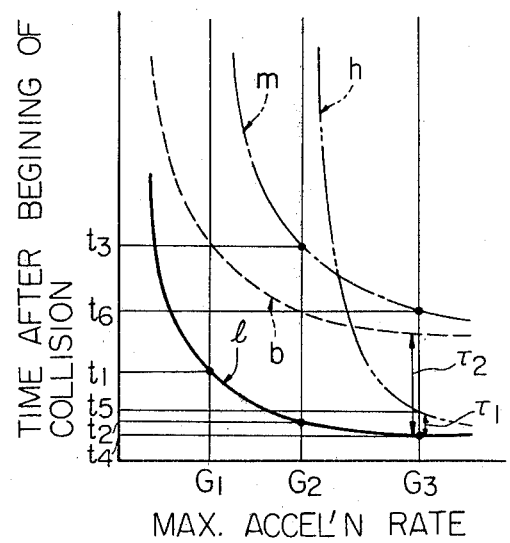
FIG. 4a is a graph showing curves which indicate performance characteristics of inertia-responsive switches which are so arranged as to be responsive to different rates of acceleration or, in other words, to impacts of different magnitudes and actuated at different time intervals after the impacts are initially responded to by the switches.
Figure 4B:
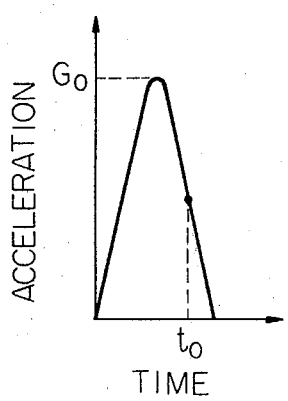
FIG. 4b is a graph showing a waveform of a rate of acceleration to which the switches having the performance characteristics shown in FIG. 4a are subjected.

FIG. 4a illustrates performance characteristics of various inertia-responsive switches as exhibited when the switches are subjected to various rates of acceleration each of which varies with time forming a parabolic curve peaking up at $G_o$ as seen in FIG. 4b. The time interval indicated on the axis of abscissa of the graph of FIG. 4a is the time which has lapsed until each inertia-responsive switch is closed after it is initially subjected to the rate of acceleration having the waveform shown in FIG. 4b, the time being indicated by $t_o$ in FIG. 4b. In FIG. 4a, curves $1$, $1'$, $m$ and $h$ are indicative of the performance characteristics of a switch responsive to a relatively low rate of acceleration and actuated within a relatively short time interval (curve 1), a switch responsive to a relatively low rate of acceleration and actuated within a relatively long time interval (curve $1'$), a switch responsive to a medium rate of acceleration and actuated within a relatively long time interval (curve $m$), and a switch responsive to a relatively high rate of acceleration and actuated within a relatively short time interval (curve $h$). The low, medium and high rates of acceleration above mentioned are indicated by $G_1$, $G_2$ and $G_3$, respectively and are assumed to be produced when the motor vehicles collide with stationary obstacles during cruising at speeds of 15, 30 and 50 km/hour, respectively.

From the curves $1, 1', m$ and $h$ of FIG. 4a, it is apparent that the switches are actuated within shorter time intervals when subjected to increased rates of acceleration and that, when subjected to relatively high rates of acceleration in the neighbourhood of $G_3$, the switches are actuated within substantially the same time intervals as indicated by $\tau_1$ which is a difference between the time intervals within which the switches having the characteristic curves 1 and $h$ are actuated. Comparison between the curves 1 and $1'$ will, furthermore reveal that, even though the switches are adapted to be responsive to the same rate of acceleration, the difference between the switch actuation time intervals can be varied relatively broadly as indicated by $\tau_2$ if the switches are so arranged as to be actuated within different time intervals, viz., the distances $d$ and $d'$ (FIG. 1 or 2) of the switches are selected to have different values.

As previously pointed out with reference to the curves a and b of FIG. 3, the rate of acceleration produced as a result of a collision encountered by a motor vehicle reaches a first peak at an incipient stage of the collision condition. In order that the inflatable confinement of the described vehicle safety arrangement be expanded stepwise to its full capacity to accomplish the objects of the present invention, the switches incorporated in the safety arrangement should be not only responsive to different rates of acceleration but also actuated within different time intervals.

Figure 5:
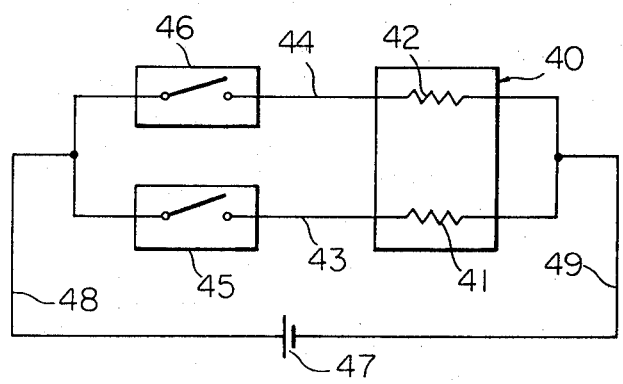
FIGS. 5 and 6 are block diagrams showing preferred embodiments of a vehicle safety arrangement according to the present invention, the embodiments herein shown being adapted to use only one inflatable confinement or two or more confinements which are expanded during collision condition all in common modes.

With this in mind, reference will now be made to FIG. 5 which illustrates a first preferred embodiment of the vehicle safety arrangement according to the present invention. In FIG. 5, the vehicle safety arrangement is shown to comprise a single inflatable confinement 40 which is illustrated schematically in a block form. The inflatable confinement 40 is expanded by first and second electrically-actuated, explosive-charged, gas-generating means 41 and 42, respectively, which are disposed independently of each other. Each of the gas-generating means 41 and 42 usually consists, though not shown, of a sealed container storing pressurized gas or an explosive charge for generating gas under pressure when blasted, and a blasting means such as an electric blasting cap to blast off the seal of the container or firing the explosive charge when electrically energized. The construction and operation of the gas-generating means 41 and 42 are well known in the art and may be selected as desired, and thus no further description thereof will be herein incorporated.

The gas-generating means 41 and 42 have electric input terminals respectively connected through lines 43 and 44 to input terminals of first and second inertia-responsive switches 45 and 46. The input terminals of the switches 45 and 46 are connected in parallel to the positive terminal of a d.c. power source 47 through a line 48, the negative terminal of the power source 47 being connected to the other terminals of the gas-generating means 41 and 42 through a line 49, and grounded (not shown).

The first inertia-responsive switch 45 is responsive to an impact of a magnitude above a first predetermined level $g_1$ which is in agreement with the previously mentioned relatively low rate of acceleration $G_1$ produced when a collision is encountered by the motor vehicle at a relatively low speed of, for example, 15 km/hour. This switch 45 is further actuated or closed within a relatively short time interval after it has been subjected to an impact of the magnitude above the first predetermined level $g_1$. The second inertia-responsive switch 46, on the other hand, is arranged to respond to an impact of a magnitude above a second predetermined level $g_2$ which is in agreement with the previously mentioned medium rate of acceleration $G_2$ produced when a collision is encountered at a vehicle speed of, for example, 30 km/hour. The second switch 46 is, furthermore, actuated within a relatively long time interval after the switch has been subjected to the impact of the magnitude above the second predetermined level $g_2$. The first and second inertia-responsive switches 45 and 46 are, thus, assumed to provide the performance characteristics which are represented by the curves l and m, respectively, in the graph of FIG. 4a. The relationship between the first and second predetermined levels $g_1$ and $g_2$ is such that the former is lower than the latter.

When, in operation, the motor vehicle equipped with the safety arrangement of the character above described encounters a collision at a relatively low speed resulting in a rate of acceleration higher than $G_1$ but lower than $G_2$, then the first inertia-responsive switch 45 responds to an impact above the first predetermined level $g_1$ and immediately closes at time $t_1$ (FIG. 4a) so that the first gas-generating means 41 is energized from the d.c. power source 47, thereby expanding the inflatable confinement 40 to part of its full capacity by the gas under pressure directed thereinto from the gas-generating means 41. Since, under these conditions, the impact exerted on the switches 45 and 46 is of a magnitude which is below the second predetermined level $g_2$, the second inertia-responsive switch 46 remains open so that the second gas-generating means 42 is maintained at rest.

When, on the other hand, the motor vehicle encounters a collision at a medium speed creating a rate of acceleration higher than $G_2$, then both of the first and second inertia-responsive switches 45 and 46 will respond to an impact above the second predetermined level $g_2$. As a consequence, the first switch 45 is immediately closed at time $t_2$ (FIG. 4a) so as to cause the inflatable confinement 40 to be expanded to part of its full capacity by the gas under pressure delivered from the first gas-generating means 41 and, thereafter, the second switch 46 closes at a delayed time as at time $t_3$ (FIG. 4a) for thereby causing the inflatable confinement 40 to be expanded to its full capacity by the gas under pressure directed thereinto from the second gas-generating means 42.

While the inflatable confinement 40 in the vehicle safety arrangement above described is expanded to part of its full capacity in response to a collision condition at a relatively low velocity, the same is expanded stepwise to its full capacity during a collision condition at a medium velocity by reason of the delayed timing at which the second inertia-responsive switch 46 closes. In this instance, the first and second gas-generating means 41 and 42, respectively, may be so arranged as to deliver the gas under pressure in substantially equal volumes or in volumes which are appropriately proportioned. The inflatable confinement 40, on the other hand, may communicate in its entirety with both of the gas-generating means 41 and 42 or may be divided into two separate sections which respectively communicate with the first and second gas-generating means 45 and 46.

Figure 6:
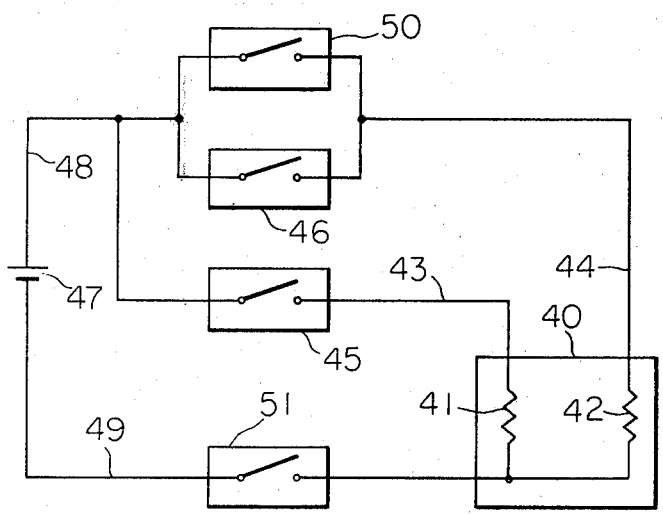

FIG. 6 illustrates a second preferred embodiment of the vehicle safety arrangement according to the present invention. The embodiment herein shown is a modification of the embodiment of FIG. 5 and, thus, includes an inflatable confinement 40, first and second electrically-actuated, explosive-charged, gas-generating means 41 and 42, and first and second inertia-responsive switches 45 and 46 having the described performance characteristics, viz., those represented by the curves 1 and m, respectively (FIG. 4a). In addition to those units which constitute the arrangement of FIG. 5, the vehicle safety arrangement shown in FIG. 6 includes a third inertia-responsive switch 50 which is connected in parallel with the second inertia-responsive switch 46 between the lines 44 and 48. This third inertia-responsive switch 50 is responsive to an impact of a magnitude above a third predetermined level $g_3$ which corresponds with the previously mentioned relatively high rate of acceleration $G_3$ produced as a result of a collision of a motor vehicle at a relatively high velocity of, for example, 50 km/hour. The level $g_3$ is thus above the second predetermined level $g_2$ so that $g_1 < g_2 < g_3$. The third inertia-responsive switch 50 is, furthermore arranged to actuate within a relatively short time interval after it has been subjected to an impact of a magnitude above the third predetermined level $g_3$. Thus, the third switch 50 has the performance characteristics which are represented by the curve $h$ in FIG. 4a. The safety arrangement illustrated in FIG. 6 further comprises as preferable a failure-proof switch 51 which is interposed between the power source 47 and the output terminals of the gas-generating means 41 and 42. This fourth switch 51 is of the type which is similar to the first inertia-responsive switch 45 and is thus responsive to an impact of a magnitude above the first predetermined level $g_1$ and actuated within a relatively short time interval after it has been subjected to such an impact.

When, in operation, the motor vehicle equipped with the safety arrangement of FIG. 6 encounters a collision at a relatively low velocity resulting in a rate of acceleration $G_1$, then the first and fourth switches 45 and 50 concurrently close at time $t_1$ (FIG. 4a), thereby completing a closed circuit through the power source 47, the first switch 45, the first gas-generating means 41 and the fourth or failure-proof switch 51. The first gas-generating means 41 is consequently actuated so as to expand the inflatable confinement 40 to part of its full capacity. Under these conditions, the second gas-generating means 42 is maintained intact because the magnitude of the impact exerted on the second and third switches 46 and 50 is below the second and third predetermined levels $g_2$ and $g_3$.

When, however, the collision is encountered by the motor vehicle at a medium velocity resulting in a rate of acceleration $G_2$, then not only the first and fourth switches 45 and 51 but also the second switch 46 responds to an impact of a magnitude which is above the second predetermined level $g_2$. The first and fourth switches 45 and 51, respectively, close at time $t_2$ and cause the inflatable confinement 40 to be expanded to part of its full capacity in a manner described above. Within a certain interval (which corresponds to a time period of $t_3 - t_2$) after the first and fourth switches 45 and 51 are closed, the second inertia-responsive switch 46 closes at time $t_3$ (FIG. 4a) so that another closed circuit is completed through the power source 47, the second switch 46, the second gas-generating means 42 and the fourth switch 51. The inflatable confinement 40 is consequently expanded to its full capacity by the gas under pressure delivered from the second gas-generating means 42.

In the event the motor vehicle encounters a collision at a relatively high velocity resulting in a rate of acceleration $G_3$, then not only the first, second and fourth switches 45, 46 and 51, respectively, but also the third inertia-responsive switch 50 responds to an impact of a magnitude above the third predetermined level $g_3$. The third switch 50 is adapted to close within a relatively short time interval after it has responded to such an impact as previously mentioned, the first, third and fourth switches 45, 50 and 51, respectively, close virtually concurrently as at time $t_4$ or $t_5$ (FIG. 4a) so that both the first and second gas-generating means 41 and 42, respectively, are actuated to expand the inflatable confinement 40 to its full capacity immediately after the impact is first applied to the switches 45, 50 and 51. The second switch 46 will then close at a retarded timing of $t_6$ (FIG. 4a) but, since the first and second gas-generating means 41 and 42 have been actuated under these conditions, the second switch 46 does not contribute to the operation of the safety arrangement.

The fourth or failure-proof switch 51 is used, by preference, to avoid unwanted actuation of the gas-generating means 41 and 42 and is, therefore, not material to the operation of the safety arrangement. It is apparent that this switch 51 may be interposed between the positive terminal of the power source 47 and the input terminals of the switches 45, 46 and 50.

The following table gives examples of the performance characteristics of the switches 45, 46, 50 and 51 incorporated in the FIG. 6 safety arrangement above described, wherein the column under "Velocity" indicates the velocities of the vehicles encountering the collisions which result in the previously defined first, second and third predetermined impact levels $g_1$, $g_2$ and $g_3$, respectively, and the column under "Actuation Time Interval" indicate the time intervals within which the switches 45, 46, 50 and 51 are actuated to close in response to impacts of the magnitudes at the levels $g_1$, $g_2$ and $g_3$.

| Velocity | Actuation Time Interval (milli-seconds) | | |
| --- | --- | --- | --- |
| | 1st and 4th switches | 2nd switch | 3rd switch |
| 15 km/hr. | 12 | Not actuated | Not actuated |
| 30 km/hr. | 11 | 25 | Not actuated |
| 50 km/hr. | 10 | 23 | 15 |

While the embodiments thus far described with reference to FIGS. 5 and 6 are directed to a vehicle safety arrangement having a single inflatable confinement, the embodiments illustrated in FIGS. 7 to 10 are directed to a vehicle safety arrangement having two separate inflatable confinements one of which is allocated to a driver of a motor vehicle and the other one is allocated to a vehicle occupant other than the driver, usually an occupant of the front seat neighbouring the driver. As discussed previously, the occupant of the front seat neighbouring the driver is left with practically no protective restraint during a collision condition as compared to the driver who will be restrained by the steering wheel or, in late model motor vehicles, positively protected by a collapsible, impact-absorbing steering column. Where the motor vehicle is to be equipped with the safety arrangement of the nature described herein, it is advisable to have the inflatable confinements expanded according to different schemes for the driver and the neighbouring occupant of the front seat. The embodiments shown in FIGS. 7 to 10 are adapted to specifically achieve this purpose.

Figure 7:
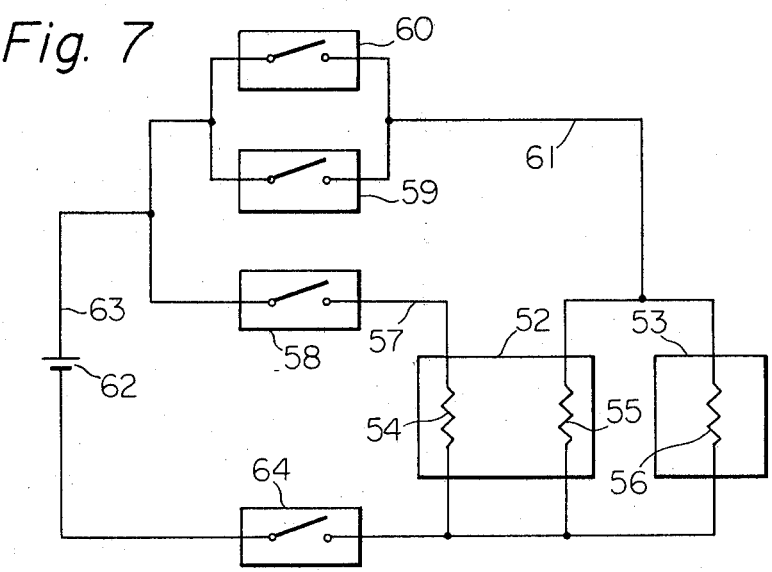
FIGS. 7 to 10 are block diagrams showing other preferred embodiments and modifications of a vehicle safety arrangement according to the present invention, the embodiments herein shown being adapted to use two or more inflatable confinements which are expanded during collision condition in modes differing from each other.

Referring to FIG. 7, the safety arrangement now includes first and second separate inflatable confinements 52 and 53, respectively. The first inflatable confinement 52 is larger in full capacity than the second inflatable confinement 53 and, thus, the former is assumed to be allocated to a vehicle occupant other than a driver and the latter assumed to be allocated to the driver. The first inflatable confinement 52 is open to or has two separate sections (not shown) which are respectively open to first and second electrically-actuated, explosive-charged, gas-generating means 54 and 55, respectively, while the second inflatable confinement is open to a third electrically-actuated, explosive-charged, gas-generating means 56. These gas-generating means 54, 55 and 56 are similar in construction and effect to those incorporated in the embodiments illustrated in FIGS. 5 and 6 and, as such, the description of the gas-generating means 41 and 42 shown in FIGS. 5 and 6 will apply to those of FIG. 7 substantially without change.

The first gas-generating means 54 is connected through a line 57 to an output terminal of a first inertia-responsive switch 58 and the second and third gas-generating means 55 and 56 are connected in parallel to output terminals of second and third in parallel connected inertia-responsive switches 59 and 60 through a single line 61. All these switches 58, 59 and 60 have input terminals connected in parallel to the positive terminal of a d.c. power source 62 through a line 63. The negative terminal of the power source 62 is connected to grounding terminals of the gas-generating means 54, 55 and 56 preferably across a fourth or failure-proof inertia-responsive switch 64. The first to fourth inertia-responsive switches 58, 59, 60 and 64 are similar in effect to their counterparts of the embodiment shown in FIG. 6 and, accordingly, the first and fourth switches 58 and 64 have performance characteristics represented by the curve $i$ in FIG. 4a and the second and third switches 59 and 60 have performance characteristics which are represented by the curves $m$ and $h$, respectively, of FIG. 4a.

When, now, a motor vehicle equipped with the safety arrangement of the character above described encounters a collision at a relatively low velocity of, for example, 15 km/hour resulting in a rate of acceleration $G_1$ previously defined, then the first and fourth inertia-responsive switches 58 and 64 will immediately close at time $t_1$ (FIG. 4a) in response to an impact of a magnitude above the previously defined first predetermined level of $g_1$. The first gas-generating means 54 is consequently actuated to expand the first inflatable confinement 52 to part of its full capacity. Under these conditions, the second and third gas-generating means 55 and 56, respectively, are maintained at rest because the magnitude of the impact applied to the second and third switches 59 and 60, respectively, is short of the second predetermined level $g_2$. Thus, only the first inflatable confinement 52 to protect the vehicle occupant other than the driver is expanded to a limited degree and the second inflatable confinement 53 to protect the driver is held inoperative when a collision is encountered at a relatively low vehicle velocity.

When, on the other hand, the motor vehicle encounters a collision at a medium velocity of, for example 30 km/hour creating a rate of acceleration $G_2$, then not only the first and fourth inertia-responsive switches 58 and 64 but also the second inertia-responsive switch 59 are subjected to an impact of a magnitude above the second predetermined level $g_2$ so that the switches 58 and 64 concurrently close at time $t_2$ (FIG. 4a) and thereafter the second switch 59 closes at time $t_3$. The first inflatable confinement 52 is accordingly expanded first to part of its full capacity through closing of the first switch 58 and the fourth switch 64 and then, after a time delay of $t_{3\,i} - t_2$, to the full capacity through closing of the second switch 59. The second inflatable confinement 53 to protect the vehicle driver is, on the other hand, expanded to its full capacity at time $t_3$ through closing the switch 59. While all these occur, the third switch 60 remains open because the magnitude of the impact applied thereto is below the third predetermined level of $g_3$.

When, furthermore, a collision is encountered by the motor vehicle at a relatively high velocity of, for example, 50 km/hour resulting in a rate of acceleration $G_3$, then the first and fourth switches 58 and 64 concurrently close at time $t_4$ and the third switch 60 closes at a time $t_5$ in response to an impact of a magnitude above the third predetermined level $g_3$. In these conditions both the first and second inflatable confinements 52 and 53, respectively, are expanded to their full capacities substantially immediately after the impact is imparted to the switches 58, 60 and 64. The second switch 59 will close after a delay at time $t_6$ (FIG. 4a) after the switches 58, 60 and 64 have closed. The switch 59, however, does not contribute to the operation of the safety arrangement because the inflatable confinements 52 and 53 have been fully expanded when the switch closes.

Figure 8:
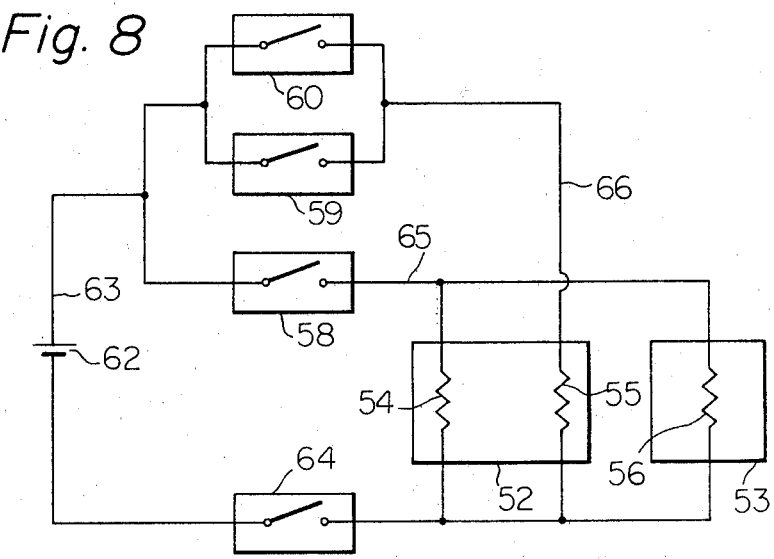

In the vehicle safety arrangement above described it has been assumed to have the second inflatable confinement 53 to protect the vehicle driver and to expand through closing of the second or third and fourth switches 59 or 60 and 64, viz., in response to an impact resulting from collision condition brought about at a medium to high vehicle velocity, the second inflatable confinement 53 may be arranged to expand in response to an impact resulting from a collision condition also at a relatively low vehicle velocity, an example of which vehicle safety arrangement is illustrated in FIG. 8.

Referring to FIG. 8, the first and third gas-generating means 54 and 56 for the first and second inflatable confinements 52 and 53, respectively, are connected in parallel to the first switch 58 through a line 65 while the second gas-generating means 55 of the first inflatable confinement 52 is connected in series to the in parallel connected second and third switches 59 and 60 through a line 66. The first inflatable confinement 52 to protect a vehicle occupant other than the driver is expanded in the same manner as in the safety arrangement shown in FIG. 7. The second inflatable confinement 53 to protect the driver in the arrangement shown in FIG. 8 is, however, adapted to be expanded to its full capacity whenever it is subjected to an impact of a magnitude above the first predetermined level $g_1$, viz., the motor vehicle encounters a collision at not only medium and high but also at a relatively low vehicle velocity.

Figure 9:
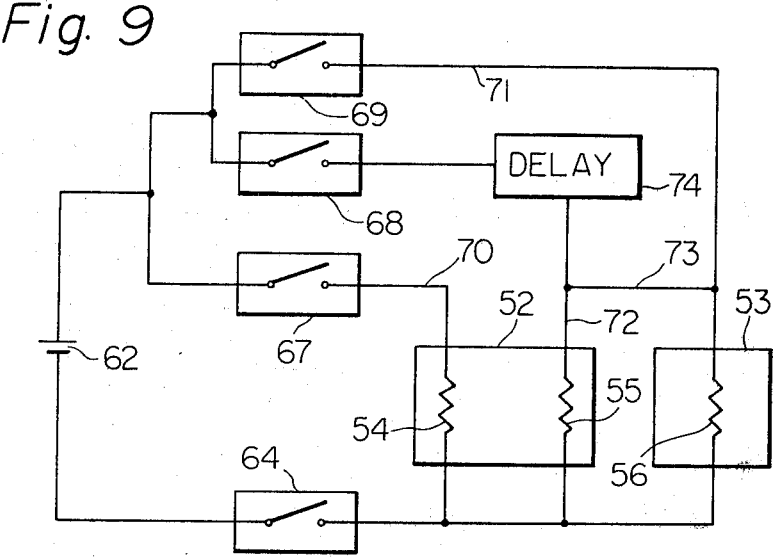

The embodiment shown in FIG. 9 is such that an electric delay circuit is utilized as the retarding means in lieu of the second inertia-responsive switch 59 having the delayed closing characteristics in the safety arrangement shown in FIG. 7 or 8.

Referring to FIG. 9, the vehicle safety arrangement now uses first, second and third switches 67, 68 and 69, respectively, in addition to the failureproof switch 64. These switches 67, 68 and 69 are respectively adapted to be actuated in response to impacts of magnitude above the previously defined predetermined levels $g_1$, $g_2$ and $g_3$ resulting from collision conditions creating respective rates of acceleration of $G_1$, $G_2$ and $G_3$. No delayed closing characteristics are, however, afforded to these switches 67, 68 and 69. The first and third switches 67 and 69 are connected in series between the power source 62 and the first and third gas-generating means 54 and 56 for the first and second inflatable confinements 52 and 53 through lines 70 and 71, respectively. The second switch 68, on the other hand, is connected in parallel with the third switch 69 and in series between the power source 62 and the second and third gas-generating means 55 and 56 for the first and second inflatable confinements 52 and 53 through lines 72 and 73, respectively, and across a delay circuit 74. The delay circuit 74 is adapted to deliver an output voltage to the second and third gas-generating means 55 and 56 of the first and second inflatable confinements 52 and 53, respectively, within a time interval of $t_3 - t_2$ (see FIG. 4a) after it has been energized from the power source 62 through the second switch 68 when the switch 68 is closed. The operation of the embodiment above described is similar to that of the embodiment shown in FIG. 7 and, as such, description thereof will not be herein repeated.

Figure 10:
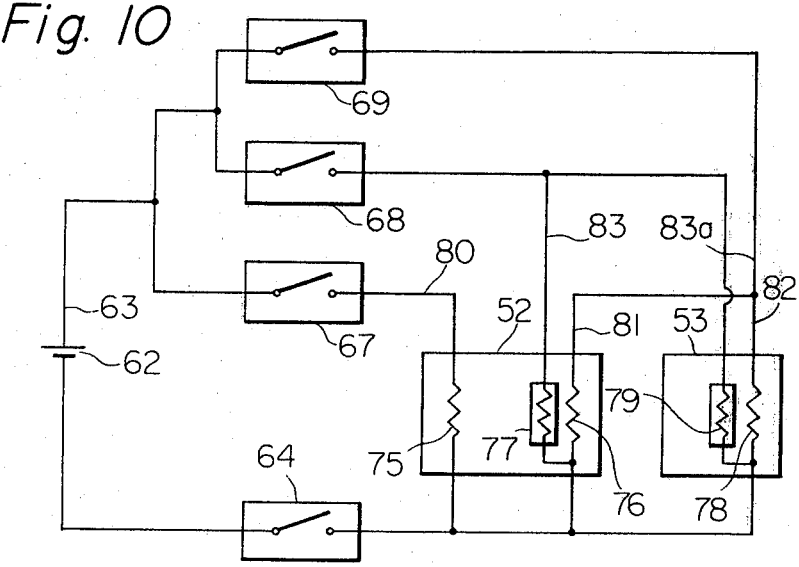

FIG. 10 illustrates another modification of the embodiment shown in FIG. 7. In the embodiment herein shown, the first, second and third switches have the same performance characteristics as those of the switches 67, 68 and 69, respectively, of the embodiment shown in FIG. 9. Different from the embodiment of FIG. 9, the vehicle safety arrangement herein shown uses gas-generating means with combinations of quick-action and delayed-action electric blasting caps to fire the explosive charges disposed in the gas-generating means for the first and second inflatable confinements 52 and 53, respectively. Thus, the first gas-generating means (not numbered) for the first inflatable confinement 52 now includes a first quick-action electric blasting cap 75 and the second gas-generating means (not numbered) of the same confinement includes a combination of a second quick-action electric blasting cap 76 and a first delayed-action electric blasting cap 77. The third gas-generating means (not numbered) for the second inflatable confinement 53, on the other hand, includes a combination of a third quick-action electric blasting cap 78 and a second delayed-action electric blasting cap 79. The quick-action blasting caps 76 and 78 are adapted to fire the associated explosive charges in the first and second gas-generating means, respectively, immediately when they are energized, while the delayed-action blasting caps 77 and 79 are adapted to fire the explosive charges in the first and second gas-generating means, respectively, within a selected time interval of, for example, $t_3 - t_2$ (FIG. 4a) after they are energized. The first quick-action blasting cap 75 is electrically connected to the first switch 67 through a line 80 and the second and third quick-action blasting caps 76 and 78 are electrically connected in parallel in the third switch 69 through lines 81 and 82, respectively. The first and second delayed-action blasting caps 77 and 79, on the other hand, are electrically connected in parallel to the second switch 68 through lines 83 and 83a, respectively, as shown. All the input terminals of the first to third switches 67 to 69 are connected to the positive terminal of the d.c. power source 62 the negative terminal of which is connected through the fourth or failure-proof switch 64 to the grounding terminals of the blasting caps 75 to 79. The failure-proof fourth switch 64 may be of the inertia-responsive type as previously mentioned or of any other desired type insofar as it is reliably responsive to a collision condition of the motor vehicle.

When, in operation, a collision is encountered at a relatively low vehicle velocity, then only the first and fourth switches 67 and 64, respectively, close in response to an impact of a magnitude above the predetermined level $g_1$ previously defined. The first quick-action blasting cap 75 of the first inflatable confinement 52 is accordingly energized from the power source 62 causing the first inflatable confinement 52 to expand to part of its capacity. When, however, an impact of a magnitude above the predetermined level $g_2$ as in a collision condition brought about at a medium vehicle velocity, then the first, second and fourth switches 67, 68 and 64, respectively, concurrently close to energize the first quick-action blasting cap 75 of the first inflatable confinement 52 and the first and second delayed-action blasting caps 77 and 79 of the first and second inflatable confinements 52 and 53, respectively. The first inflatable confinement 52 is consequently expanded first to part of its full capacity by the firing of the first quick-action blasting cap 75 and thereafter to the full capacity by the firing of the delayed-action blasting cap 77. The second inflatable confinement 53, on the other hand, remains at rest when the first inflatable confinement 52 is expanded to part of its capacity and is fully expanded concurrently as the first inflatable confinement 52 is expanded to the full capacity.

When, furthermore, the motor vehicle encounters a collision at a relatively high velocity so that an impact of a magnitude above the predetermined level $g_3$ is imparted to the four switches 67 to 69 and 64, then all the switches concurrently close, causing the first, second and third quick-action blasting caps 75, 76 and 78, respectively, to be energized from the power source 62. The first and second inflatable confinements 52 and 53, respectively are consequently expanded to their respective full capacities substantially immediately after the impact is initially applied to the switches 67 to 69 and 64. The delayed-action blasting caps 77 and 79 are left useless during the collision condition encountered at the relatively high vehicle velocity.

Figure 11:
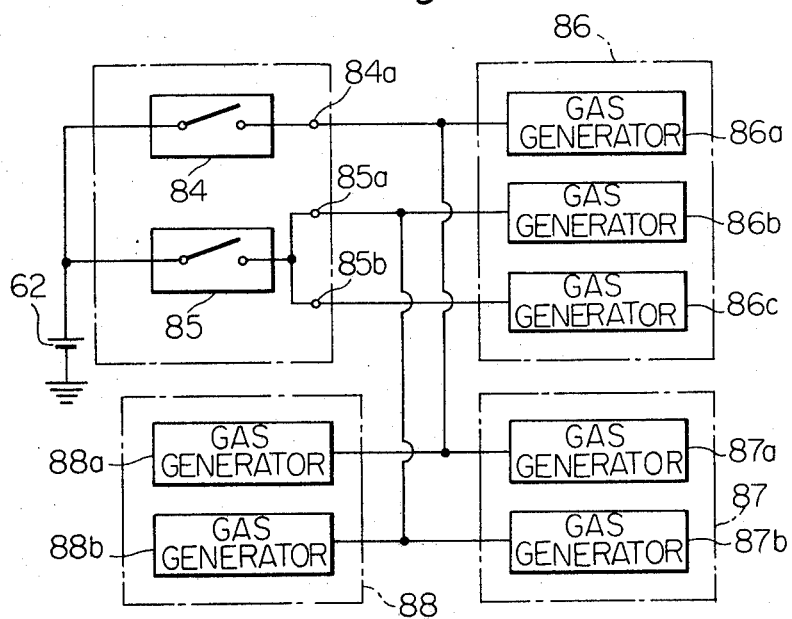
FIG. 11 is a block diagram showing still another preferred embodiment of a vehicle safety arrangement according to the present invention, the embodiment herein shown being adapted to use three or more inflatable confinements which are expanded during collision condition in different modes.

FIG. 11 illustrates still another preferred embodiment of the vehicle safety arrangement according to the present invention. In contrast to the thus far described embodiments of the safety arrangement in which only one or two inflatable confinements are actuated by the actions of two or three acceleration-responsive switches, the embodiment shown in FIG. 11 has incorporated therein three inflatable confinements which are actuated by means of two switches which, in this instance, are assumed to be of the previously described inertia-responsive type.

Figure 12:
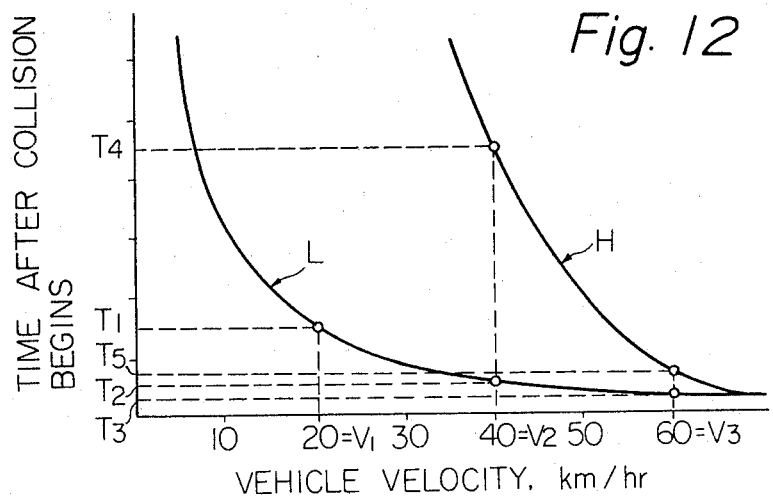
FIG. 12 is a graph showing curves which indicate performance characteristics of switch means incorporated in the embodiment illustrated in FIG. 11.

Referring to FIG. 11, the vehicle safety arrangement as shown comprises first and second inertia-responsive switches 84 and 85 which are assumed to have performance characteristics represented by curves L and H in FIG. 12 which is similar to FIG. 4a. Thus, the first inertia-responsive switch 84 is adapted to be actuated at times $T_1$, $T_2$ and $T_3$ wherein $T_1 < T_2 < T_3$ when subjected to impacts resulting from collisions encountered at vehicle velocities of $v_1$, $v_2$ and $v_3$, respectively, wherein $v_1 < v_2 < v_3$. The second inertia-responsive switch 85, on the other hand, is adapted to be actuated at times $T_4$ and $T_5$ wherein $T_4 > T_5$ when subjected to impacts resulting from collisions encountered at the vehicle velocities of $v_2$ and $v_3$, the time $T_4$ being considerably longer than the time $T_2$ and the time $T_5$ being substantially equal to the time $T_3$. The velocities $v_1$, $v_2$ and $v_3$ are herein assumed to be approximately 20, 40 and 60 km/hour, respectively, as indicated in FIG. 12.

The first inertia-responsive switch 84 has only one output terminal 84a while the second inertia-responsive switch 85 has two, first and second output terminals 85a and 85b, respectively. The respective input terminals of the first and second switches 84 and 85, respectively, are connected in parallel to the positive terminal of the d.c. power source 62.

The safety arrangement shown in FIG. 11 further comprises first, second and third inflatable confinements 86, 87 and 88, respectively, of similar or different capacities as desired. Within the first inflatable confinement 86 are positioned first, second and third gas-generating means 86a, 86b and 86c, respectively, of the previously described nature. Likewise, first and second gas-generating means 87a and 87b, respectively, are positioned within the second inflatable confinement 87 and first and second gas-generating means 88a and 88b, respectively, are positioned within the third inflatable confinement 88. The first gas-generating means 86a, 87a and 88a of the first, second and third inflatable confinements 86, 87 and 88, respectively, are connected in parallel to the only output terminal of the first inertia-responsive switch 84. The second gas-generating means 86b, 87b and 88b of the first, second and third inflatable confinements 86, 87 and 88, respectively, are connected in parallel to the first output terminal 85a of the second inertia-responsive switch 85. The third gas-generating means 86c of the first inflatable confinement 86 is connected to the second output terminal 85b of the second switch 85, as illustrated.

When, in operation, the motor vehicle equipped with the safety arrangement of the nature above described encounters a collision while cruising at a velocity of from 10 to 30 km/hour, say at 20 km/hour, then the first inertia-responsive switch 84 closes at time $T_1$ so that the first, gas-generating means 86a, 87a and 88a of the first, second the third inflatable confinements 86, 87 and 88, respectively, are actuated. As a consequence, the first inflatable confinement 86 is expanded to approximately one-third of its full capacity and the second and the third inflatable confinements 87 and 88 are expanded each to one-half of the full capacity because, under these conditions, the second switch 85 is held inoperative so that the remaining gas-generating means are maintained at rest. The inflatable confinements 86, 87 and 88 are in this manner only partially expanded during the collision condition at a relatively low vehicle velocity and, thus, will fail to securely seize or protect the vehicle occupants at an incipient stage of the collision condition. As the vehicle occupants are flung onto the individual confinements thus partially expanded, the confinements will become sufficiently tight against the occupants' bodies by reason of the pressure exerted by the occupants. The occupants involved in the collision are accordingly softly received by the confinements and are reliably protected from injury. Where the safety arrangement is provided with a gas discharge valve which is to be opened to discharge the pressurized gas from the expanded confinement for the protection of the occupant from being forcefully rebounded by the expanded confinement after the collision has ended, such a valve will remain inoperative under the conditions the confinements are expanded only partially as above described.

When, however, the motor vehicle encounters a collision at a medium velocity of from 30 to 50 km/hour, say, 40 km/hour, then the first switch 84 closes to actuate the first gas-generating means 86a, 87a and 88a of the first, second and third inflatable confinements 86, 87 and 88, respectively, at time $T_2$ and thereafter the second switch 85 closes to actuate the second and third gas-generating means 86b and 86c of the first inflatable confinements 87 and 88, respectively, and the second gas generating means 87b and 88b of the second and third confinements, respectively, at time $T_4$. The first inflatable confinement 86 is thus expanded first to one-third of its full capacity at time $T_2$ and then to the full capacity at time $T_4$ while the second and third inflatable confinements 87 and 88 are expanded each to one-half of the full capacity at time $T_2$ and then to the full capacity at time $T_4$. The inflatable confinements 86, 87 and 88 are in this manner stepwise expanded to their respective full capacities during the collision condition encountered at a medium vehicle velocity. In this instance, the gas discharge valve, if any, will become operative after a predetermined time interval so as to relieve the pressurized gas from the expanded confinements for the reasons previously discussed.

When, on the other hand, the motor vehicle encounters a collision at a relatively high velocity of higher than 50 km/hour, say, at 60 km/hour, then the first and second switches 84 and 85 close substantially concurrently at times $T_3$ and $T_5$, respectively, actuating all the gas-generating means so that the first, second and third inflatable confinements 86, 87 and 88 are expanded to their respective full capacities substantially immediately after the switches 84 and 85 are initially subjected to the impact. Where the gas-discharge valve is provided as previously noted, the valve will become operative to discharge the pressurized gas from the expanded confinements.

Figure 13:
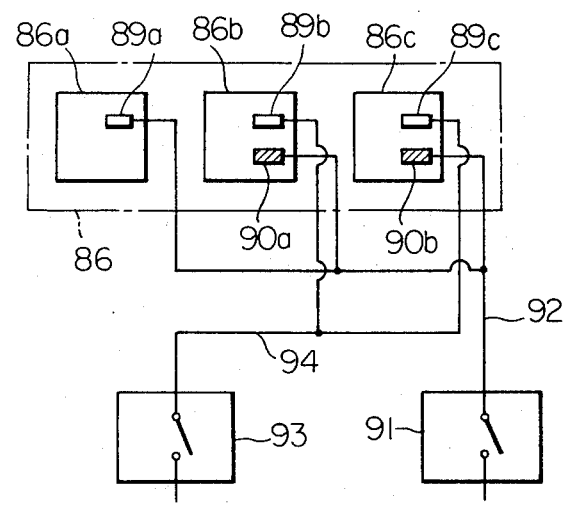
FIGS. 13 and 14 illustrate modifications of the embodiment illustrated in FIG. 11.
Figure 14:
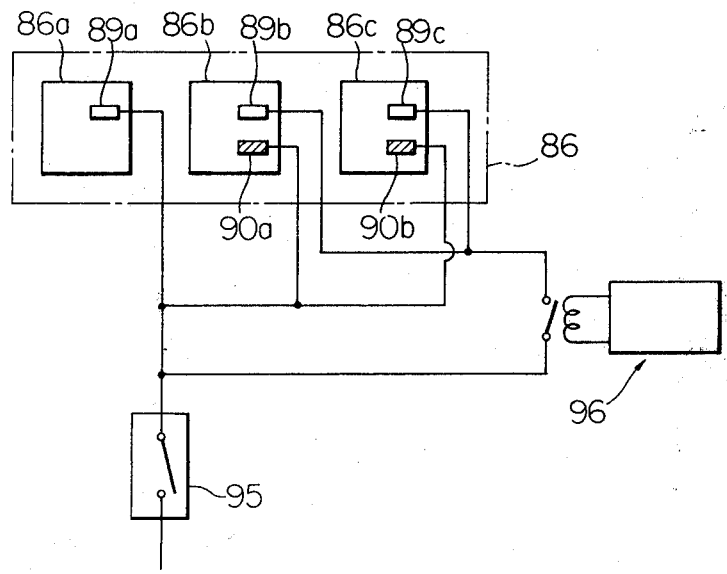

The delayed timings at which the second switch 85 closes in response to the collision condition are provided in the above described arrangement by the inertia-response characteristics of the second switch 85. FIGS. 13 and 14 illustrate modifications of such an embodiment wherein the delayed timings desired are provided by the delayed-action electric blasting caps which are combined with the quick-action electric blasting caps as in the case of the embodiment previously described with reference to FIG. 10. The arrangements shown in FIGS. 13 and 14 are also provided with three separate inflatable confinements as in the arrangement illustrated in FIG. 11, only one of the confinements is illustrated at 86 for the brevity of illustration.

Referring to FIG. 13, the inflatable confinement 86 has positioned therewithin first, second and third gas-generating means 86a, 86b and 86c, respectively. The first, second and third gas-generating means 86a, 86b and 86c include first, second and third quick-action electric blasting caps 89a, 89b and 89c, respectively, while the second and third gas-generating means 86b and 86c include first and second delayed-action electric blasting caps 90a and 90b, respectively, containing therein explosion delaying powder. The first quick-action blasting cap 89a of the first gas-generating means 86a and the first and second delayed-action blasting caps 90a and 90b of the second and third gas-generating means 86b and 86c, respectively, are connected in parallel to a first switch 91 through a line 92. The second and third quick-action blasting caps 89b and 89c of the second and third gas-generating means 86b and 86c are, on the other hand, connected in parallel to a second switch 93 through a line 94. The first and second switches 91 and 93 are adapted to be actuated in response to impacts of magnitudes caused by collisions encountered at vehicle velocities above predetermined levels of, for example, $v_1$ and $v_2$ previously defined. The delayed-action electric blasting caps 90a and 90b may be so arranged as to be capable of actuating the associated explosive charges in time intervals of, for example, 10 and 20 milli-seconds, respectively.

When, in operation, a collision is encountered by the motor vehicle at a relatively low vehicle velocity of, say, 20 km/hour, then the first switch 91 closes to energize the first quick-action blasting cap 89a of the first gas-generating means 86a and the first and second delayed-action blasting caps 90a and 90b of the second and third gas-generating means 86b and 86c, respectively. As a consequence, the first gas-generating means 86a is actuated immediately after the collision is initially brought about and thereafter the delayed-action gas-generating means 90a and 90b are actuated successively in, for example, about 10 and 20 milli-seconds, respectively, after the first quick-action blasting cap 89a has been actuated. The inflatable confinement 86 is in this manner expanded in three consecutive steps to its full capacity during the collision condition encountered at a relatively low vehicle velocity.

When, on the other hand, the motor vehicle encounters a collision at a relatively high velocity of, for example, 40 km/hour, then both of the first and second switches 91 and 93 will close, concurrently energizing all the blasting caps of the three gas-generating means 86a, 86b and 86c. The quick-action blasting caps 89a, 89b and 89c are all concurrently actuated to fire the associated explosive charges before the delayed-action blasting caps 90a and 90b become operative so that the inflatable confinement 86 is expanded to its full capacity in a single step immediately after the impact is initially imparted to the switches 91 and 93.

Illustrated in FIG. 14 is a modification of the embodiment above described, wherein a first switch 95 responsive to a condition in which a collision is encountered or likely to be encountered by the motor vehicle and a second switch 96 responsive to the velocity of the motor vehicle are used in lieu of the first and second switches 91 and 93, respectively, of the embodiment shown in FIG. 13. It should be noted that the second switch 96, even when closed, does not connect the power source to the quick-action blasting caps 89b and 89c unless the first switch 95 is also closed, as shown in FIG. 14. The entire arrangement herein shown is similar in effect to the embodiment of FIG. 13 in that the first quick-action blasting cap 89a of the first gas-generating means and the delayed-action blasting caps 90a and 90b of the second and third gas-generating means 86b and 86c, respectively, are actuated successively during a collision condition at a relatively low velocity wherein the second switch 96 is left open and that all the quick-action blasting caps 89a, 89b and 89c of the first, second and third gas-generating means 86a, 86b and 86c, respectively, are all actuated simultaneously with both of the first and second switches 95 and 96, respectively, closed during a collision condition encountered at a relatively high vehicle velocity.

Figure 15:
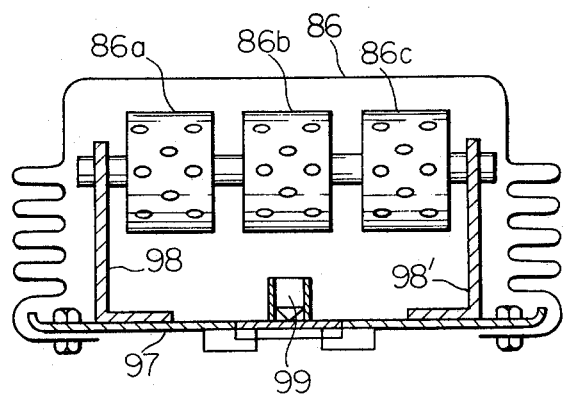
FIG. 15 is a schematic sectional view of an overall mechanical configuration of the safety arrangement shown in block form in each of FIGS. 11, 13 and 14.

In any of the embodiments and modifications illustrated in FIGS. 11, 13, and 14, the gas-generating means are positioned within the inflatable confinements so as to provide a compact and small-sized configuration of the arrangement. FIG. 15 illustrates an example of such a configuration wherein only one inflatable confinement is shown as at 86 for the sake of brevity. The inflatable confinement 86, shown as held in its inoperative position, is fastened to a supporting plate 97 and has accommodated therein three gas-generating means 86a, 86b and 86c of the nature described. The gas-generating means 86a, 86b and 86c are held in position within the inflatable confinement 86 by means of brackets 98 and 98'. Designated by 99 is a gas-discharge valve which is mounted on the supporting plate 97 for discharging the pressurized gas from the confinement 86 when the confinement is expanded to its full capacity, as previously discussed.

Figure 16:
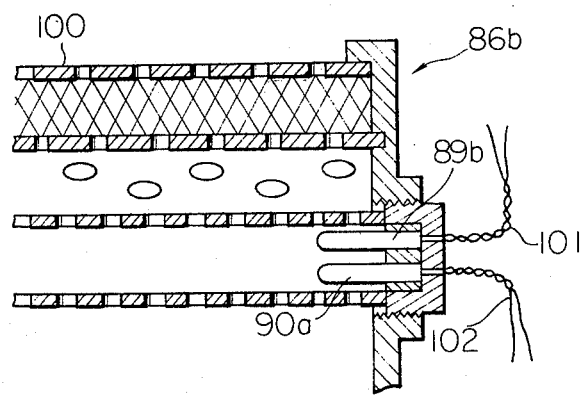
FIG. 16 is a fragmentary sectional view of igniting means for an explosive charge disposed in the safety arrangement illustrated in FIG. 15.

FIG. 16 illustrates an example of the construction of the gas-generating means using the combination of the quick-action and delayed-action electric blasting caps as in the embodiments shown in FIGS. 13 and 14. The gas-generating means, designated as a whole by reference numeral 86b has a container 100 for storing an explosive charge which is to be fired by one of the quick-action electric blasting cap 89b and the delayed-action electric blasting cap 90a as the case may be and as described with reference to FIGS. 13 and 14. The quick-action and delayed-action blasting caps 89b and 90a are positioned in parallel to each other extending into the container 100 and are electrically connected to leads 101 and 102, respectively. The leads, are, in turn, connected to the second and first switches 93 and 91 or 96 and 95 of the arrangement shown in FIGS. 13 and 14.

What is claimed is:

1. A vehicle safety arrangement which comprises at least one inflatable confinement to be expanded to a protective position in response to one of an impact exerted on the vehicle and a condition which is likely to lead to such an impact, first and second electrically-actuated, explosive-charged, gas-generating means each operative to direct gas under pressure into the at least one inflatable confinement when actuated, first and second switch means which are electrically connected in parallel to a power source and in series between said source and said first and second gas-generating means, respectively, and which are responsive to impacts of magnitudes above first and second predetermined levels, respectively, of which the former is lower than the latter, each of said first and second gas-generating means being actuated so as to direct the gas under pressure into the at least one inflatable confinement when the switch means connected therewith responds to an impact of a magnitude above the level which is predetermined therefor, and retarding means operatively connected with said second switch means and said second gas-generating means for causing the second gas-generating means to be actuated at a retarded timing after the first gas-generating means has been actuated in response to the impact so that the inflatable confinement is expanded substantially immediately to part of its full capacity when the magnitude of the impact detected by the first and second switch means is above said first predetermined level and below the second predetermined level and stepwise to the full capacity of the confinement when said magnitude of the impact is above said second predetermined level and further comprising a third switch means which is electrically connected in parallel with said second switch means to the power source and in series between said source and the second gas-generating means and which is responsive to an impact of a magnitude larger thann a third predetermined level which is above said second predetermined level so that the inflatable confinement is expanded substantially immediately to its full capacity when the magnitude of the impact detected by the three switch means is above said third predetermined level.

2. A vehicle safety arrangement which comprises at least two, first and second, inflatable confinements to be expanded to respective protective positions by gas under pressure in response to one of an impact exerted on the vehicle and a condition which is likely to lead to such an impact, first and second electrically-actuated, explosive-charged, gas-generating means each of which is operative, when actuated, to direct gas under pressure into the first inflatable confinement, a third electrically-actuated, explosive-charged, gas-generating means which is operative to direct gas under pressure into the second inflatable confinement when actuated, a first switch means which is electrically connected in series between a power source and said first gas-generating means and which is responsive to an impact of a magnitude above a first predetermined level, second and third switch means which are electrically connected between said power source and said second and third gas-generating means and which are responsive to impacts of magnitudes which are above second and third predetermined levels wherein the second predetermined level is above the first predetermined level and the third predetermined level is above the second predetermined level, and retarding means operatively associated with the second switch means for causing the second gas-generating means to be actuated at a retarded timing when the second switch means responds to an impact of a magnitude above said second predetermined level, whereby the first inflatable confinement is expanded substantially immediately to part of its full capacity when the magnitude of the impact detected by the three switch means is above the first predetermined level and below the second predetermined level, the first inflatable confinement is expanded stepwise and the second inflatable confinement is expanded immediately to their respective full capacities when the magnitude of the impact is above the second predetermined level and below the third predetermined level, and the first and second inflatable confinements are expanded substantially immediately when the magnitude of the impact is above the third predetermined level.

3. A vehicle safety arrangement as claimed in claim 2, in which each of said first, second and third switch means comprises an electrically conductive stationary member serving as a stationary electric contact, an electrically conductive mass member movable relative to said stationary member and serving as a movable electric contact, and biasing means for urging said mass member to be spaced apart from said stationary member, wherein the mass member of said second switch means is spaced apart from the associated stationary member by the biasing means a distance which is larger than a distance between the mass and stationary members of each of said first and third switch means so that said retarded timing is provided by the longer the mass member of said second switch means requires to contact said stationary member.

4. A vehicle safety arrangement as claimed in claim 2, in which said retarding means comprises an electric delay circuit which is connected between said second switch means and said second and third gas-generating means.

5. A vehicle safety arrangement as claimed in claim 2, in which each of said first, second and third gas-generating means includes an explosive charge and an electric blasting cap to fire the explosive charge when energized from said power source, wherein said retarding means comprises explosion delaying powder contained in the blasting cap of said second gas-generation means.

6. A vehicle safety arrangement as claimed in claim 2, in which said second switch means is responsive to vehicle velocity and actuated in response to a vehicle velocity above a predetermined level.

7. A vehicle safety arrangement as claimed in claim 2, in which said first inflatable confinement has its protective position allocated for a vehicle occupant other than a driver of the vehicle and said second inflatable confinement has its protective position allocated for the driver.

8. A vehicle safety arrangement which comprises at least two, first and second, inflatable confinements to be expanded to respective protective positions by gas under pressure in response to one of an impact exerted on the vehicle and a condition which is likely to lead to such an impact, first and second electrically-actuated, explosive-charged, gas-generating means each of which is operative, when actuated, to direct gas under pressure into the first inflatable confinement, a third electrically-actuated, explosive-charged, gas-generating means which is operative to direct gas under pressure into the second inflatable confinement when actuated, a first switch means which is electrically connected in series between a power source and in parallel connected said first and third gas-generating means and which is responsive to an impact of a magnitude above a first predetermined level, second and third switch means which are electrically connected in parallel to said power source and in series between said source and said second gas-generating means and which are responsive to impacts of magnitudes which are above second and third predetermined levels wherein the second predetermined level is above the first predetermined level and the third predetermined level is above the second predetermined level, and retarding means operatively connected with the second switch means for causing the second gas-generating means to be actuated at a retarded timing when the second switch means responds to an impact of a magnitude above said second predetermined level, whereby the second inflatable confinement is expanded substantially immediately to part of its full capacity when the magnitude of the impact detected by the three switch means is above the first predetermined level and below the second predetermined level, and the first inflatable confinement is expanded stepwise and the second inflatable confinement is expanded immediately to their respective full capacities when the magnitude of the impact is above the second predetermined level and below the third predetermined level, and the first and second inflatable confinements are fully expanded substantially immediately when the magnitude of the impact is above the third predetermined level.

9. A vehicle safety arrangement as claimed in claim 8, in which each of said first, second and third switch means comprises an electrically conductive stationary member serving as a stationary electric contact, an electrically conductive mass member movable relative to said stationary member and serving as a movable electric contact, and biasing means for urging said mass member to be spaced apert from said stationary member, wherein the mass member of said second switch means is spaced apart from the associated stationary member by the biasing means a distance which is larger than a distance between the mass and stationary members of each of said first and third switch means so that said retarded timing is provided by a longer time the mass member of said second switch means requires to contact said stationary member.

10. A vehicle safety arrangement as claimed in claim 8, in which each of said first, second and third gas-generating means includes an explosive charge and an electric blasting cap to fire the explosive charge when energized from said power source, wherein said retarding means comprises explosion delaying powder contained in the blasting cap of said second gas-generation means.

11. A vehicle safety arrangement as claimed in claim 8, in which said second switch means is responsive to vehicle velocity and actuated in response to a vehicle velocity above a predetermined level.

12. A vehicle safety arrangement as claimed in claim 8, in which said first inflatable confinement has its protective position allocated for a vehicle occupant other than a driver of the vehicle and said second inflatable confinement has its protective position allocated for the driver.

* * * * *